(12) United States Patent
Paycher et al.

(10) Patent No.: US 10,887,048 B2
(45) Date of Patent: Jan. 5, 2021

(54) BLUETOOTH TRANSMISSION USING LOW DENSITY PARITY CHECK

(71) Applicant: Apple Inc., Cupertino, CA (US)

(72) Inventors: Alon Paycher, Beit Hananya (IL); Naftali Sommer, Rishon LeZion (IL); Tal Inbar, Hod HaSharon (IL); Sriram Hariharan, San Jose, CA (US); Axel Berny, Cupertino, CA (US); Roi Faust, Ra'anana (IL); Eli Ochayon, Tel-Aviv (IL); Sreeraman Anantharaman, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/583,598

(22) Filed: Sep. 26, 2019

(65) Prior Publication Data

US 2020/0106552 A1    Apr. 2, 2020

Related U.S. Application Data

(60) Provisional application No. 62/737,193, filed on Sep. 27, 2018.

(51) Int. Cl.

| H04W 4/80 | (2018.01) |
|---|---|
| H04B 7/00 | (2006.01) |
| H04L 1/00 | (2006.01) |
| H04W 76/14 | (2018.01) |
| H04L 1/18 | (2006.01) |
| H04B 7/26 | (2006.01) |

(52) U.S. Cl.
CPC ............. *H04L 1/0045* (2013.01); *H04B 7/26* (2013.01); *H04L 1/0057* (2013.01); *H04L 1/18* (2013.01); *H04W 76/14* (2018.02)

(58) Field of Classification Search
CPC ................ H04B 7/0652; H04B 7/0656; H04B 7/18582; H04B 7/26; H04W 76/14; H04W 4/80; H04W 28/04; H04L 1/0045; H04L 1/0057; H04L 1/18
See application file for complete search history.

(56) References Cited

U.S. PATENT DOCUMENTS

| 5,751,740 | A * | 5/1998 | Helbig, Sr. | ............. | G06F 11/10 |
|---|---|---|---|---|---|
| | | | | | 711/203 |
| 10,484,008 | B2 * | 11/2019 | Zhang | ................ | H03M 13/1128 |
| 2003/0002499 | A1 * | 1/2003 | Cummings | ........... | H04L 1/1877 |
| | | | | | 370/389 |

(Continued)

*Primary Examiner* — Andrew Wendell
(74) *Attorney, Agent, or Firm* — Fay Kaplun & Marcin, LLP

(57) ABSTRACT

A sink device is configured to establish a Bluetooth connection with a source device. The sink device receives a transmission from the source device that includes a plurality of data blocks, an item of check information, and a plurality of parity blocks during a transmission time duration. The sink device determines, prior to receiving an entirety of the transmission, whether at least one of received data blocks includes an error based on at least the item of check information and, when the at least one of the received data blocks includes the error and prior to receiving all of the plurality of parity blocks, the sink device performs an error correction operation on a first one of the received data blocks based on a first one of the parity blocks.

20 Claims, 7 Drawing Sheets

(56) References Cited

U.S. PATENT DOCUMENTS

| | | | |
|---|---|---|---|
| 2007/0092034 A1* | 4/2007 | Yu | H03M 13/6538 |
| | | | 375/295 |
| 2009/0077447 A1* | 3/2009 | Buckley | H04L 1/0061 |
| | | | 714/757 |
| 2010/0262887 A1* | 10/2010 | Wilson | H04L 1/0071 |
| | | | 714/758 |
| 2014/0223256 A1* | 8/2014 | Sakai | G06F 11/1012 |
| | | | 714/758 |
| 2016/0112825 A1* | 4/2016 | Miller | H04W 12/04 |
| | | | 455/41.2 |
| 2017/0005674 A1* | 1/2017 | Hussain | H03M 13/2975 |
| 2017/0279464 A1* | 9/2017 | Noh | H03M 13/116 |
| 2017/0338952 A1* | 11/2017 | Hong | H04L 9/0858 |
| 2018/0007683 A1* | 1/2018 | You | H04L 1/0067 |
| 2019/0327778 A1* | 10/2019 | Morris | H04W 76/15 |

* cited by examiner

BLUETOOTH TRANSMISSION USING LOW DENSITY PARITY CHECK

PRIORITY INFORMATION/INCORPORATION BY REFERENCE

This application claims priority to U.S. Provisional Application 62/737,193 entitled "Bluetooth Transmission Using Low Density Parity Check," filed on Sep. 27, 2018, the entirety of which is incorporated herein by reference

BACKGROUND INFORMATION

A user equipment (UE) may be configured with a variety of different wireless communications capabilities. For example, the UE may be capable of establishing a wireless connection with another UE (e.g., a peer connection). This connection may be made using a short-range or mid-range communication protocol, such as a Bluetooth or WiFi connection. The Bluetooth connection provides a comparatively lower throughput communication pathway for data to be exchanged, e.g., between a source device and a sink device.

SUMMARY

In exemplary embodiments a method is performed by a sink device configured to establish a Bluetooth connection with a source device and receive, during a transmission time duration, a transmission comprising a plurality of data blocks, an item of check information, and a plurality of parity blocks. The method includes determining, prior to receiving an entirety of the transmission, whether an error is included in at least one of the received data blocks based on at least the item of check information. When at least one of the received data blocks includes the error and prior to receiving all of the plurality of parity blocks, an error correction operation is performed on at least one of the received data blocks based on a first parity block of the plurality of parity blocks.

In further exemplary embodiments, a sink device having a transceiver and a processor is described. The transceiver is configured to establish a Bluetooth connection with a source device and receive, during a transmission time duration, a transmission comprising a plurality of data blocks, an item of check information, and a plurality of parity blocks. The processor is configured to determine, prior to receiving an entirety of the transmission, whether at least one of the received data blocks includes an error based on at least the item of check information. The processor is further configured to, when the at least one of the received data blocks includes the error and prior to receiving all of the plurality of parity blocks, perform an error correction operation on at least one of the received data blocks based on a first parity block of the plurality of parity blocks.

In still further exemplary embodiments, a method is performed by a sink device configured to establish a Bluetooth connection with a source device and to receive transmissions in respective transmission time durations. The method includes receiving a first transmission from the source device in a first transmission time duration, the first transmission including a plurality of data blocks and an item of check information. The method also includes determining whether at least one of the received data blocks includes an error based on at least the item of check information. When the error is included in the at least one of the received data blocks, a second transmission is received from the source device in a second transmission time duration, the second transmission includes one or more parity blocks. An error correction operation is performed on the at least one of the received data blocks based on a first parity block of the one or more parity blocks.

DETAILED DESCRIPTION

Figure 1:
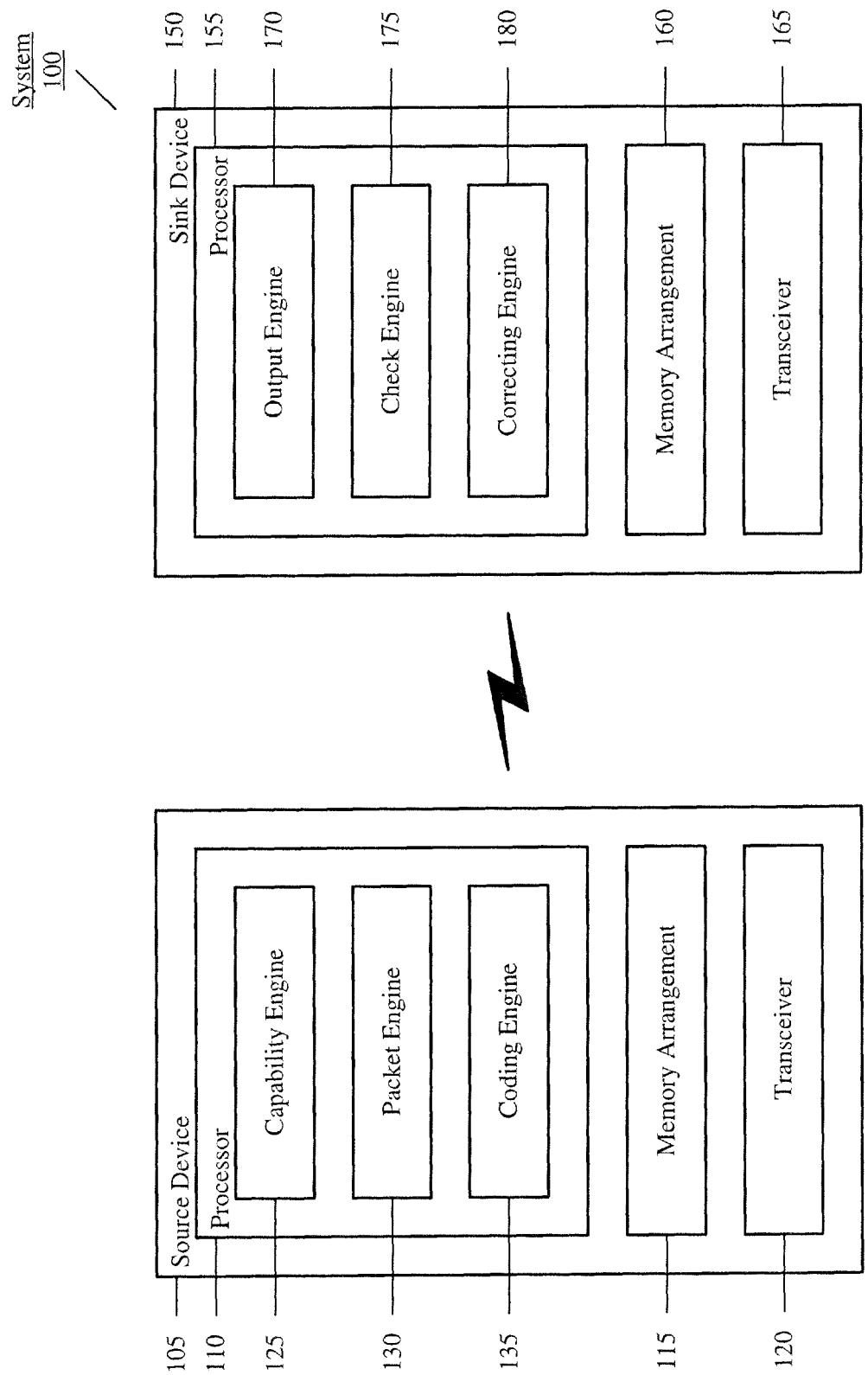
FIG. 1 shows an exemplary system in which a source device exchanges data with a sink device, according to various exemplary embodiments described herein.

The exemplary embodiments may be further understood with reference to the following description and the related appended drawings, wherein like elements are provided with the same reference numerals. The exemplary embodiments are related to devices, systems, and methods for using a Bluetooth connection to transmit parity data from a source device to a sink device. The sink device may use the parity data to correct payload data in one or more received packets. In accordance with a first transmission mechanism, the parity data may be included in an unused portion of one or more Bluetooth transmission time durations. In a second transmission mechanism, the parity data may be used in a dynamic manner, e.g., based at least in part on a result of a prior attempt to transmit the packet. In using the transmission mechanisms according to the exemplary embodiments, the sink device may be capable of conserving (or reducing the consumption of) battery power by reducing receive operations and/or reducing use of corresponding receiving components. The transmission mechanisms according to the exemplary embodiments may also improve efficiency in transmitting packets from the source device to the sink device, e.g., by providing frequency diversity and/or signal to noise ratio (SNR) improvement.

Initially, the exemplary embodiments are described herein with regard to a Bluetooth connection. However, the use of the Bluetooth connection and corresponding operations associated with the Bluetooth connection are only exemplary. The exemplary embodiments may be modified to be used with any type of wireless connection, such as a peer to peer connection (e.g. Wi-Fi Direct, etc.), and corresponding operations associated with the wireless connection.

The exemplary embodiments are also described herein with regard to an electronic device, such as a user equipment (UE) device, performing operations corresponding to a source device and/or a sink device. However, the electronic device as described herein is only exemplary. The exemplary embodiments may be utilized with any device that may establish a peer-to-peer (P2P) connection (hereinafter referred to as the "Bluetooth connection"), such as a short- or medium-range connection, as well as be configured with the hardware, software, and/or firmware to establish the P2P connection. Therefore, the electronic device, as described herein, is used to represent any device capable of establishing a Bluetooth connection. The arrangement including a source device and sink device is also only exemplary. The exemplary embodiments may relate to any two or more devices that establish the Bluetooth connection through which data is exchanged. Therefore, the source and sink relationship is only exemplary and is intended to represent any connection between devices.

The exemplary embodiments are further described herein with regard to parity data that is used to correct payload data in a received packet (e.g., forward error correction). However, the use of the parity data is only exemplary. The exemplary embodiments may utilize any redundancy data and/or correcting data that is different from the payload data of a packet. Thus, the parity data described herein may represent any data used to correct the payload data of a packet. The exemplary embodiments are described with respect to correcting payload data that was received with an error, e.g., corrupted payload data. This should be understood to also include payload data that was not received. For example, as described below, a packet may include multiple data blocks and one or more of the data blocks may not be received at all. The exemplary embodiments may also be used to correct data blocks that were not received, in addition to those that are received in a corrupted state. Thus, throughout this description, when it is described that a packet or data block is received with an error, this includes corrupted data blocks and data blocks that were never received.

The exemplary embodiments are additionally described herein with regard to a Bluetooth transmission time duration for a packet to be exchanged between the source device and the sink device. As will be described in detail below, the Bluetooth transmission time duration and utilizing advanced Bluetooth transmission technologies may enable parity data to be used for efficiently exchanging data. However, the use of the Bluetooth transmission time duration and the advanced Bluetooth transmission technologies is only exemplary. As will be apparent to one skilled in the art, the exemplary embodiments may be implemented or modified to be used with any wireless transmission protocol between two electronic devices.

The exemplary embodiments relate to configurations in which a source device transmits packets to a sink device over a Bluetooth connection, in which the source device and sink device are configured to utilize advanced Bluetooth technologies that enable high data rates (hereinafter referred to as "Bluetooth HDR"). Using Bluetooth HDR, the throughput over the Bluetooth connection may be increased from 2 Mbps, e.g., to 3-8 Mbps or above 8 Mbps. As a result of this increased throughput, packet timing for specific applications (e.g., audio streaming) may be reduced, e.g., by two to four times. The term Bluetooth HDR should be understood to include any transmission protocol or scheme that provides a higher data rate than a conventional Bluetooth data rate, e.g., Bluetooth Classic, Bluetooth Low Energy, Bluetooth enhanced data rate (e.g., EDR2).

To provide some examples, a conventional Bluetooth EDR2 connection may allow for a packet of 640 bytes to be transmitted within a Bluetooth transmission time duration of 2800 µs. Bluetooth EDR2 may have an interferer immunity (C/I) of 10 to 12 dB and exhibit a sensitivity of −94 dBm. In contrast to Bluetooth EDR2, a Bluetooth HDR4 protocol may utilize less time to transmit the same amount of data. For example, a packet of 640 bytes may be transmitted in 1,700 µs using Bluetooth HDR4. Bluetooth HDR4 may have a C/I of 10 to 12 dB and exhibit a sensitivity of −93.5 dBm. Further still, a Bluetooth HDR8 protocol may utilize even less time to transmit the same amount of data. For example, a packet of 640 bytes may be transmitted in 1,000 µs using Bluetooth HDR8. The Bluetooth HDR8 may have a C/I of 10 to 12 dB and exhibit a sensitivity of −90.5 dBm.

As is evident from the above exemplary values, the Bluetooth HDRs may result in an increased throughput and a decreased packet transmission time compared to the conventional Bluetooth EDR2 protocol. For example, in comparing Bluetooth EDR2 with Bluetooth HDR4, the decrease in the packet transmission time results in nearly doubling the throughput. In another example, in comparing Bluetooth EDR2 with Bluetooth HDR8, the decrease in the packet transmission time results in nearly tripling the throughput.

In view of the above described efficiency and manner of transmitting data from the source device to the sink device, the exemplary embodiments provide features to Bluetooth HDR protocols to increase transmission efficiency and power conservation. For example, in a first transmission mechanism according to the exemplary embodiments, the remaining portion of the Bluetooth transmission time duration (e.g., slot) may be used for redundancy data. Since the throughput is increased and the packet transmission time is decreased with Bluetooth HDR, the unused portion of the Bluetooth transmission time duration may be utilized to further improve radio frequency (RF) characteristics (e.g., link margin, C/I, etc.) by using the redundancy data. The exemplary embodiments using the first transmission mechanism enable a dynamic approach to deactivating receiving operations and receiving components to conserve power.

In a second transmission mechanism according to the exemplary embodiments, parity data may be transmitted dynamically in available Bluetooth transmission time durations, as needed. For example, under the Bluetooth Specification, there may be up to three Bluetooth transmission time durations or Bluetooth slots for a packet to be transmitted, including the initial transmission and any subsequent retransmissions if a previous attempt was not successful. The parity data may allow for incorrect payload data in a received packet to be corrected without having to retransmit the packet. In this manner, receiving operations may not need to be performed and receiving components of the sink device may not need to be used for retransmissions of the packet, thereby saving power for at least the sink device. Furthermore, when using a subsequent transmission attempt to transmit the parity data, a different frequency may be selected, in accordance with the Bluetooth Specification. In this manner, frequency diversity may be achieved in transmitting the parity data. Accordingly, the exemplary embodiments under the second transmission mechanism enable a dynamic approach to a sink device successfully receiving a packet, where the mechanism includes conserving power and using different available resources, such as frequency diversity.

FIG. 1 shows an exemplary system 100 in which a source device 105 exchanges data with a sink device 150 according to various exemplary embodiments described herein. The system 100 includes a source device 105 that communicates over a Bluetooth connection with a sink device 150. For example, the source device 105 may be a portable device (e.g., a mobile computing device, a mobile phone, a personal computer, a cellular phone, a smartphone, a tablet computer, a phablet, a laptop, a VoIP phone, a personal digital assistant, an embedded device, a wearable device, a Cat-M device, a Cat-M1 device, a MTC device, an eMTC device, another type of an Internet of Things (IoT) device, etc.) or a stationary device (e.g., a desktop terminal). The sink device 150 may be another portable or stationary device (e.g., another smartphone, a wireless earpiece, a wireless headset, a wireless speaker, a wireless display device, a wearable, a hands-free headset, an intercom, a fitness tracking device, a sensor, an automobile sound system, etc.). In establishing the Bluetooth connection, the source device 105 and the sink device 150 may include the necessary hardware, software, and/or firmware to perform conventional operations as well as operations according to the exemplary embodiments.

There may be a variety of different arrangements between the source device 105 and the sink device 150. In a first example, the source device 105 may be a smartphone and the sink device 150 may be a single receiver headset (e.g., wireless headphones with internal circuitry to connect left and right audio output components). In a second example, the source device 105 may be a smartphone and the sink device 150 may be a dual receiver headset (e.g., wireless ear buds with a left ear bud and a right ear bud that are separate from one another). In a third example, the source device 105 may be a smartphone and the sink device 150 may be a wearable (e.g., a watch). In a fourth example, the source device 105 may be a wearable and the sink device 150 may be a headset (e.g., single or dual receiver). From these examples it should be understood that the source device 105 and the sink device 150 may be any type of electronic device and may include any type of peer-to-peer connection or relationship between the devices. These examples should not be seen to limit the arrangement of devices with which the techniques described herein can be used.

The source device 105 and the sink device 150 may be used to exchange data between one another for a plurality of different functionalities (e.g., audio streaming, multimedia data streaming, etc.). Accordingly, the source device 105 and the sink device 150 may include components that enable this data exchange to be performed in a manner consistent with the mechanisms according to the exemplary embodiments. As shown in FIG. 1, the source device 105 may include a processor 110, a memory arrangement 115, and a transceiver 120. The source device 105 may also include further components such as a display device, an input/output (I/O) device, and/or other components such as a portable power supply, an audio I/O device, etc. The sink device 150 may also include substantially similar components such as a processor 155, a memory arrangement 160, and a transceiver 165, as well as one or more other components.

In the examples provided below, the data or information that is exchanged between the source device 105 and the sink device 150 is described as audio data in the form of audio blocks. However, it should be understood that audio data is only an example. The exemplary embodiments may be applied to exchanges between the devices that include any type of data or information. Thus, the terms "data blocks," "information blocks" or "audio blocks" may refer to any type of data.

The processors 110, 155 may be configured to execute a plurality of engines of the source device 105 and the sink device 150, respectively. For example, the engines executed by the processor 110 may include a capability engine 125, a packet engine 130, and a coding engine 135. The capability engine 125 may be configured to determine the capabilities of the source device 105 and the sink device 150, particularly with regard to whether the Bluetooth HDR protocol is available for data exchange between the source device 105 and the sink device 150 such that the transmission mechanisms according to the exemplary embodiments may be used. The packet engine 130 may be configured to generate a packet and a transmission for the sink device 150. The coding engine 135 may be configured to encode information, e.g., as parity data that may be included in a transmission to the sink device 150. In another example, the engines executed by the processor 155 may include an output engine 170, a check engine 175, and a correcting engine 180. The output engine 170 may be configured to receive packets and to process the packets to generate the corresponding output on the sink device 150. The check engine 175 may be configured to determine whether payload data in a received packet is correct. The correcting engine 180 may be configured to apply parity data to incorrect payload data to restore or correct the payload data (e.g., the incorrect payload data in the received packet is corrected so that the payload data is considered to have been correct in the received packet such that there is no need for a retransmission of the packet).

The above described engines, each being an application (e.g., a program) executed by one or more of the processors 110, 155, is only exemplary. The functionality associated with the engines may also be represented as a separate incorporated component of the source device 105 or sink device 150, or may be a modular component coupled to the source device 105 or sink device 150, e.g., an integrated circuit with or without firmware. For example, the integrated circuit may include input circuitry to receive signals and processing circuitry to process the signals and other information. The engines may also be embodied as one application or as separate applications, or as part of one or more multifunctional programs. Accordingly, the applications may be implemented in a variety of manners in hardware, software, firmware, or any combination thereof. In addition, in some devices, the functionality described for the processors 110, 155 may be split among two or more processors such as a baseband processor and an applications processor. The exemplary embodiments may be implemented in any of these or other configurations of a device.

The memory arrangements 115, 160 may each be a hardware component configured to store data related to operations performed by the source device 105 and the sink device 150, respectively. For example, the memory arrangement 115 may store information associated with data to be transmitted and coding algorithms that maybe applied. In another example, the memory arrangement 160 may store information associated with data that is received and is subsequently processed. The transceivers 120, 165 may each be a component of the source device 105 and the sink device 150, respectively, that enables communication with other devices over one or more communication pathways. The transceivers 120, 165 may enable the Bluetooth connection between the source device 105 and the sink device 150. The transceiver 120 (or radio) may therefore be equipped with a Bluetooth radio that is capable of performing Bluetooth transmissions. Correspondingly, the transceiver 165 may be equipped with a Bluetooth radio that is capable of performing Bluetooth receiver operations. Further, the source device 105, in another arrangement, may operate as a sink device and therefore the source device 105 may also include the components and functionalities described for the sink device 150. Similarly, the sink device 150 may include the components and functionalities described for the source device 105 such that the sink device 150 may operate as a source device in another arrangement.

In the first transmission mechanism according to the exemplary embodiments, the capability engine 125 may determine the capabilities of the source device 105 and the sink device 150, including whether the Bluetooth HDR protocol is available for packet exchange between the source device 105 and the sink device 150 such that the transmission mechanisms according to the exemplary embodiments may be used. Because the first transmission mechanism utilizes a remaining (or unused) portion of a Bluetooth transmission time duration, the first transmission mechanism may be implemented, e.g., using Bluetooth HDR. For example, the conventional Bluetooth EDR2 may not have a sufficient unused portion in the Bluetooth transmission time duration nor the proper throughput to support the first transmission mechanism of the exemplary embodiments. Thus, when the capability engine 125 determines that the source device 105 and the sink device 150 are both configured to utilize the Bluetooth HDR protocol, the packet engine 130 and the coding engine 135 may be utilized in a manner consistent with the exemplary embodiments.

The packet engine 130 may generate a packet (e.g., addressed to) for the sink device 150. The packet may include a plurality of blocks. For illustrative purposes, the exemplary embodiments are described with regard to a streaming audio application where the source device 105 provides audio data to the sink device 150 for audio to be output at the sink device 150 (e.g., via the output engine 170). In other instances, one or more packets may contain any other type of data, including application data, management/control data, etc. Thus, the packet may be an audio packet including a plurality of audio blocks. For example, the audio blocks may be conventionally used audio blocks, such as based on the A2DP standard. However, other types of blocks may also be used such as blocks that carry voice data or raw audio traffic. Those skilled in the art will understand that other information may also be included in the packet, e.g., header information, control information, etc. In some implementations, the audio blocks may be generated with audio samples at 48 kHz and at 20 bits, so that the audio blocks are 300 bytes and segmented into 6 audio blocks, an example of which is shown as audio blocks 1-6 of audio blocks 215 in FIG. 2. It should be understood that a packet comprising 6 audio blocks is only exemplary and a packet may comprise more or less audio blocks.

The packet engine 130 may also generate check information so that a recipient (e.g., sink device 150) may determine whether the payload data of the packet (e.g., the audio blocks) was properly received. For example, the packet engine 130 may generate cyclic redundancy check (CRC) information for the audio blocks, an example of which is shown as CRC information 217 in FIG. 2. The CRC may be included in the packet, but for the purposes of this description, it will be considered as a separate piece of information from the payload data (e.g., audio blocks). While the exemplary embodiments are described with using the CRC information and corresponding operations as check information, other types of check information may also be used, e.g., Message Integrity Check (MIC) information and corresponding operations, in addition to or instead of the CRC information.

The coding engine 135 may encode information as parity data that may be included in a transmission to the sink device 150. For illustrative purposes, the encoding scheme used by the coding engine 135 will be described as a low density parity check (LDPC). The LDPC may be a linear error correcting code so that the parity data that is generated may be transmitted to the sink device 150 in a redundant manner (e.g., corresponding to a packet) with an error correcting code (e.g., a linear code). Those skilled in the art will understand the various ways that the LDPC may be used in generating the parity data. For example, the LDPC may utilize a sparse bipartite graph. The resulting parity data may also be based on a systematic codec. For example, as a systematic codec, the data of the packet and the parity data may be separated. An example of the parity data is shown as parity blocks 1'-6' of parity blocks 225 in FIG. 2.

The sink device 150 may not need to receive the parity data if the payload data of the packet is correct (e.g., the parity data is unnecessary because the payload data does not need to be corrected). Furthermore, the parity data may be generated using the LDPC in a manner that allows parity blocks of the parity data to be considered in an individual capacity. For example, a first parity block may be used to attempt to correct or restore the payload data of the packet; if not corrected, then a second parity block may be used to attempt to correct or restore payload data of the packet; and so on. In this manner, any remaining parity data may not need to be received by the sink device 150 (e.g., the payload data of the packet has already been corrected).

Using the above encoding approach, the coding engine 135 may generate the parity data that includes a plurality of parity blocks where each parity block may be used individually in attempting to correct the payload data of a received packet. In a particular implementation, the parity blocks may be generated with LDPC coded information with a rate of ½ so that the parity blocks are 300 bytes of coded data and segmented into 6 parity blocks. The coding engine 135 may also be used in generating the audio blocks. For example, the audio blocks may also be encoded based on the LDPC to generate LDPC audio blocks. The LDPC audio blocks may have Reed-Solomon (RS) protection that increases the chances of the receiver being able to decode the payload data without needing the parity information. The RS coding may be, for example, a 80/84 code rate (RS (80,84)), a 60/64 code rate (RS (60, 64)), etc. The parity data may be coded with no RS protection and no CRC information. The LDPC parity data is only exemplary as the exemplary embodiments may utilize any correcting scheme or comparable correcting information relative to the parity data that allows payload data of a received packet to be restored. The CRC information may also be encoded based on LDPC.

With the packet, the CRC information, and the parity data generated, the packet engine 130 may generate a transmission according to the first transmission mechanism of the exemplary embodiments. For example, the transmission may be configured so that the source device transmits the audio blocks, followed by the CRC information, and then the parity blocks of the parity data. As will be evident below, being transmitted in this order may enable the sink device 150 to perform select operations and determine whether receiving operations and receiving components may be deactivated. Those skilled in the art will understand that some of the packet fields, e.g., the header, may have the corresponding LDPC block immediately following the information field. For example, because the header includes the length of the information (payload data) field, the receiver uses this information to determine the boundary between the payload data and the parity data, and the length of the packet. Thus, the header field of the packet may be checked and corrected prior to receiving all the data blocks of the payload data.

With regard to the sink device 150, the output engine 170 may receive a packet and process the packet to generate the corresponding output on the sink device 150. As described above, in one example, the packet may be an audio packet including a plurality of audio blocks. The audio blocks received from the source device 105 may be stored in the memory arrangement 160 as, for example, PHY samples. Once stored, the check engine 175 may determine whether the payload data of the received packet is correct using, for example, the corresponding CRC information. When the payload data of the packet is correct, the audio encoded in the audio blocks may be processed to generate the corresponding audio output to be played on an audio output component of the sink device 150. The check engine 175, when the payload data is correct, may also generate an indication for the receiving operations and the receiving components to be deactivated for the remainder of the transmission time duration for the packet and may also cause an ACK to be generated and transmitted back to the source device 105 at a predetermined time in the Bluetooth transmission time duration.

However, if the payload data is not correct, the sink device 150 may continue to receive the remainder of the transmission that includes the parity data. The correcting engine 180 may apply the parity data to the incorrect payload data of the received packet to restore or correct the payload data of the packet so that the packet is constructively correct. When the payload data of the received packet is restored, the correcting engine 180 may indicate to the check engine 175 that the packet was restored. The check engine 175 may generate an indication that an ACK is to be returned to the source device 105. When the payload data of the received packet cannot be restored using the parity data, the correcting engine 180 may indicate this to the check engine 175, which may then generate an indication that a NACK is to be returned to the source device 105. As will be described in further detail below, this process may be performed within a Bluetooth transmission time duration used for the transmission from the source device 105 to the sink device 150.

Figure 2:
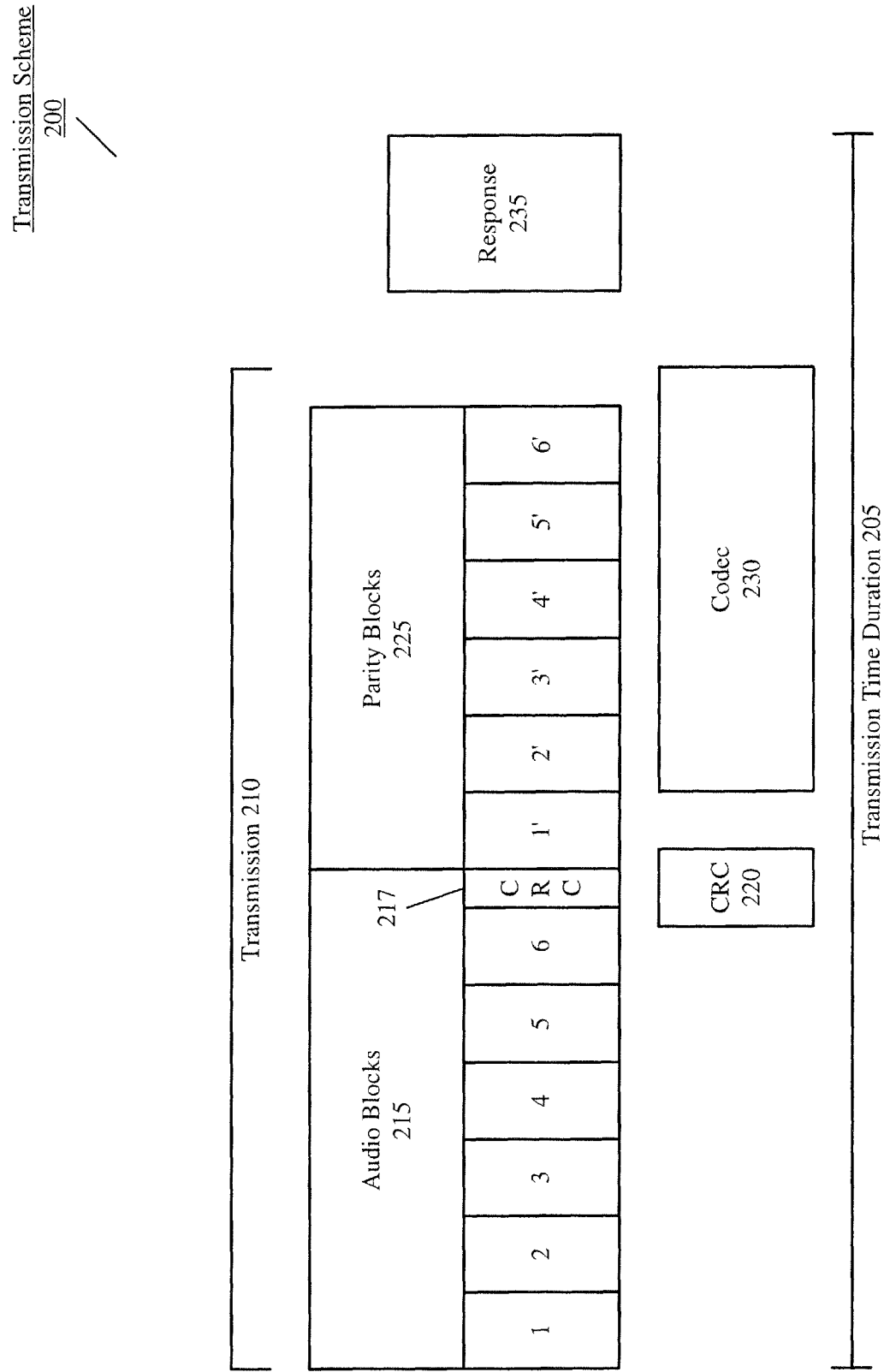
FIGS. 2 and 3 show exemplary transmission schemes for transmitting data from a source device to a sink device, according to various exemplary embodiments described herein.

FIG. 2 shows a first exemplary transmission scheme 200 to transmit data from the source device 105 to the sink device 150 according to various exemplary embodiments described herein. The transmission scheme 200 illustrates a Bluetooth transmission time duration 205 during which a transmission 210 is transmitted from the source device 105 to the sink device 150. The sink device 150 also transmits a response 235 (e.g., ACK, NACK) to the source device 105 during the transmission time duration 205 to indicate whether the payload data in the received transmission 210 is correct (e.g., error free, decodable, etc.). As described above, the transmission 210 may include a packet including audio blocks 215, CRC 217, and parity data including parity blocks 225. In an exemplary implementation, the audio blocks 215 may be segmented into 6 LDPC audio blocks with RS (80, 84) protection and occupying 300 bytes (e.g., 2 channels sampled at 48 kHz and at 20 bits-per-sample). The parity blocks 225 may be segmented into 6 parity blocks occupying 300 bytes (e.g., coded at a rate of ½) with no RS protection and no corresponding CRC information. In another example, the LDPC audio blocks may be encoded with RS (40, 42) protection. The type of encoding and the size of the blocks is only exemplary as the principles described herein may be applicable to blocks encoded in other manners (or not encoded at all) and/or having other sizes.

As the transmission 210 is being received during the Bluetooth transmission time duration 205, the receiving components of the transceiver 165 of the sink device 150 are active. With the receiving components active, the audio blocks 215 may be received and stored. When the audio blocks 215 and the CRC information 217 have been received by the sink device 150, the check engine 175 may determine whether the payload data (e.g., the audio blocks 215) in the received packet is correct, e.g., using a CRC operation 220. Although not to scale, the transmission scheme 200 illustrates that the process of performing the CRC operation 220 may be completed prior to the sink device 150 receiving the complete first parity block 225.

If the packet including the audio blocks 215 has passed the CRC operation 220, the sink device 150 may deactivate the receiving components and terminate receiving operations without having to receive the parity blocks 225. Subsequently, at the predetermined time, the sink device 150 may transmit the response 235 as an ACK to indicate to the source device 105 that payload data in the received packet was correct (e.g., error free, decodable, etc.).

If the packet including the audio blocks 215 has failed the CRC operation 220, the sink device 150 may continue receiving operations during the transmission time duration 205 to receive the parity blocks 225. The sink device 150, via the correcting engine 180, may determine whether the packet may be restored using the parity blocks 225 and a codec operation 230. The codec operation 230 may be based on the LDPC encoding mechanism. In one example, the codec operation 230 may be performed after receiving each of the parity blocks 225 until the packet is corrected. For example, the first parity block 225-1' is used to correct the first audio block 215-1, if the first audio block needs to be corrected. The CRC operation may then be performed again. If the CRC operation is successful, it may be assumed that the problem with the audio blocks 215 was caused by the first audio block 225-1 and the correction of this block resulted in a correction for the entirety of the audio blocks 215. However, if the CRC operation fails again after the correction using the parity block 225-1', the second parity block 225-2' may then be used to correct the second audio block 215-2. The CRC operation may then be performed again after the second audio block 215-2 has been corrected, and so on (parity block 225-3' used to correct audio block 215-3, parity block 225-4' used to correct audio block 215-4, etc.) until the CRC operation is successful. Thus, throughout this description, when it is described that the codec operation 230 corrected (or restored) the audio blocks 215, it should be understood that the codec operation 230, on its own, does not know if the full audio blocks 215 are restored, another operation such as the CRC operation (performed after the codec operation for each parity block 225) may make the determination if the codec operation successfully restored the audio blocks 215. While these subsequent CRC operations are not specifically described or shown in the figures for every codec operation 230, it should be understood that such subsequent CRC operations may be performed to check if the audio blocks 215 were, in fact, corrected using the codec operations 230.

If restored using the first parity block 225-1', the sink device 150 may deactivate the receiving components and terminate receiving operations. Subsequently, at the predetermined time, the sink device 150 may transmit the response 235 as an ACK. If not restored, the sink device 150 may receive the second one of the parity blocks 225-2' and perform the codec operation 230. The sink device 150 may continue this process each time the packet is not restored until all the parity blocks 225 have been received and processed. If at any time the packet is restored using any one of the parity blocks 225, the sink device 150 may deactivate the receiving components and terminate the receiving operations. The sink device 150 may then transmit the response 235, e.g., as an ACK.

In the above description, it was described that if the packet was not restored after the first parity block 225-1', the sink device 150 will receive the second parity block 225-2'. Those skilled in the art will understand that the reception of the parity blocks 225 is a generally continuous operation, e.g., the second parity block 225-2' is received immediately (or soon) after the first parity block 225-1'. Thus, typically the codec operation 230 using the first parity block 225-1' will be occurring while the second parity block 225-2' is being received and so on for the remaining parity blocks 225. If the correcting operation is successful using the first parity block 225-1', the sink device 150 may have already received the full or partial second parity block 225-2'. Any or all of this received second parity block 225-2' information may be discarded when the correcting operation was successful.

If the packet is not restored after having received the entire transmission 210 including the parity blocks 225, the sink device 150 may deactivate the receiving components and terminate the receiving operations as well as transmit the response 235, e.g., as a NACK. The source device 105 and the sink device 150 may then perform further transmission attempts as retransmission attempts when a NACK is registered. For example, after an initial transmission attempt, up to two retransmission attempts may be used. In each of these retransmission attempts, the above described first transmission mechanism may be used to transmit the packet from the source device 105 to the sink device 150. In response to receiving the NACK, the source device 105 may retransmit the packet with a higher protection level. For example, if the packet was originally transmitted with LDPC3/4, the packet may be retransmitted with LDPC1/2. In another example, the original packet may have been transmitted with no LDPC and the packet may be retransmitted with LDPC. If the data payload in the received packet is not correctly received after all transmission attempts, the packet may be dropped.

As is evident from the transmission scheme 200, the unused portion of the transmission time duration 205 that is made available based on using the Bluetooth HDR protocol may allow for redundancy information to be included in the transmission 210 so that the sink device 150 has an additional opportunity to correctly receive the payload data in the packet within a single Bluetooth transmission time duration. In this manner, the sink device 150 may have a higher likelihood of deactivating the receiving components for any remaining Bluetooth transmission time durations that may be allotted for a given packet (e.g., for two Bluetooth retransmission time durations subsequent to the transmission time duration 205). The sink device 150 may also dynamically deactivate the receiving components and terminate the receiving operations within the initial Bluetooth transmission time duration 205. For example, the sink device 150 may deactivate the receiving components and terminate the receiving operations prior to receipt of all the parity blocks 225 when one of the first five parity blocks 225 successfully restores the payload data in a received packet. In this manner, the sink device 150 may deactivate the receiving components and terminate the receiving operations for longer durations, resulting in power conservation.

The exemplary embodiments may also utilize another transmission mechanism to transmit a packet from the source device 105 to the sink device 150. In the second transmission mechanism according to the exemplary embodiments, the capability engine 125 may perform a substantially similar operation as performed with regard to the first transmission mechanism. Thus, when the capability engine 125 determines that the source device 105 and the sink device 150 are both configured to utilize the Bluetooth HDR protocol, the packet engine 130 and the coding engine 135 may be utilized in a manner consistent with the exemplary embodiments. However, if at least one of the source device 105 and the sink device 150 is not configured with the Bluetooth HDR protocol, the conventional Bluetooth EDR2 may be used. As will be described below, the second transmission mechanism may also be modified to be used with the conventional Bluetooth transmission mechanism (e.g., EDR2).

The packet engine 130 of the source device 105 may generate a transmission bound for the sink device 150. According to the second transmission mechanism of the exemplary embodiments, the transmission may be dynamically generated based on the type of transmission attempt. For example, when the transmission is an initial transmission attempt, the transmission may be a packet including a plurality of blocks. Again, for illustrative purposes, the exemplary embodiments are described with regard to a streaming audio application where the source device 105 provides audio data to the sink device 150 for audio to be output at the sink device 150 (e.g., via the output engine 170). Thus, the packet may be an audio packet including a plurality of audio blocks. The packet engine 130 may also generate check information so that a recipient may determine whether the data payload of the received packet is correct. For example, the packet engine 130 may generate CRC information for the audio blocks. In another example, when the transmission is a retransmission attempt, the transmission may be parity data including parity blocks. The parity data transmission will be described in further detail below.

The coding engine 135 may encode information as parity data when used. The coding engine 135 may perform a substantially similar functionality as the coding engine 135 performs for the first transmission mechanism described above. For example, the coding engine 135 may use an encoding scheme based on the LDPC. The coding engine 135 may generate the parity data that includes a plurality of parity blocks where each parity block may be used individually in attempting to correct an improperly received packet. Again, the parity blocks being encoded with LDPC may also allow for the audio blocks to be encoded based on the LDPC.

When the transmission is a retransmission attempt, the packet engine 130 may generate a transmission that includes parity data without the packet. As the retransmission attempt is being used in response to a NACK being received by the source device 105, it is known that the previously transmitted packet in the initial transmission attempt was not successfully received by the sink device 150. The parity data in the ensuing retransmission attempt may therefore be used to restore or otherwise regenerate the packet, allowing for successful decoding.

In one exemplary implementation, a total of three transmission attempts may be used, including an initial transmission attempt and two retransmission attempts for a packet.

The above describes the first retransmission attempt according to the second transmission mechanism. The second retransmission attempt may have various implementations. In a first example, the above described process for the first retransmission attempt may be performed a second time. For example, the second retransmission attempt may include only the parity data without the packet payload. Thus, the sink device 150 may again use the parity data or a variant of the parity data, which is different from the parity data in the first retransmission attempt, to attempt to restore the packet. In a second example, the above described process for the initial transmission attempt may be performed a second time. For example, the second retransmission attempt may include the packet without the parity data. Thus, the sink device 150 may again attempt to successfully receive the packet. In a third example, the above described process for the first transmission mechanism may be used. For example, the second retransmission attempt may include the packet and the parity data in an attempt to have the sink device 150 receive the payload data of the packet correctly. It should be understood that a total of three transmission attempts is only exemplary and the exemplary embodiments may be implemented based on any number of transmission attempts that are used for a packet, including a single transmission attempt, two transmission attempts or greater than three transmission attempts.

The Bluetooth Specification may specify the manner in which the transmission attempts are to be performed, including with regard to diversity, such as frequency diversity. For example, the Bluetooth Specification may specify that a frequency hopping scheme is to be used for each transmission attempt. Thus, for a set of transmission attempts for a given packet, frequency diversity may be used. Accordingly, assuming all transmission attempts are used (e.g., initial and 2 retransmissions), the manner in which the second transmission mechanism is performed may result in the packet being transmitted using a first Bluetooth frequency, the parity data being transmitted using a second Bluetooth frequency, and the third transmission (in any of the above described manners) using a third Bluetooth frequency. In this manner, the second transmission mechanism may take advantage of frequency diversity between the packet data and the parity data.

With regard to the sink device 150, the output engine 170 may perform a substantially similar functionality that the output engine 170 performs in the first transmission mechanism. For example, the output engine 170 may receive a packet and process the packet to generate the corresponding output on the sink device 150.

At the sink device 150, the data received from the source device 105 may be stored in the memory arrangement 160. The check engine 175 may determine whether the payload data in a packet is correct. If correct, the check engine 175 may generate an indication for the receiving operations to be deactivated for the remainder of the transmission time duration and any transmission time durations for retransmissions. Furthermore, the indication may cause an ACK to be generated and transmitted back to the source device 105 at a predetermined time in the Bluetooth transmission time duration. However, if not correct, the sink device 150 may continue to receive subsequent transmissions provided in retransmission attempts.

During a retransmission attempt, the parity data may be received on a different frequency. The correcting engine 180 may apply the parity data to attempt to restore or correct the packet. Again, in one example and as described above, a feature of the parity data may be that each parity block of the parity data may be used in an individual capacity to restore the received packet. If the packet is restored, the correcting engine 180 may indicate to the check engine 175 that the packet was restored. Accordingly, the check engine 175 may generate an indication that an ACK is to be returned to the source device 105. If the packet is not restored, the correcting engine 180 may indicate to the check engine 175 that the packet was not restored. The check engine 175 may generate an indication that a NACK is to be returned to the source device 105. With a NACK, any further available retransmission attempts may be used.

Figure 3:
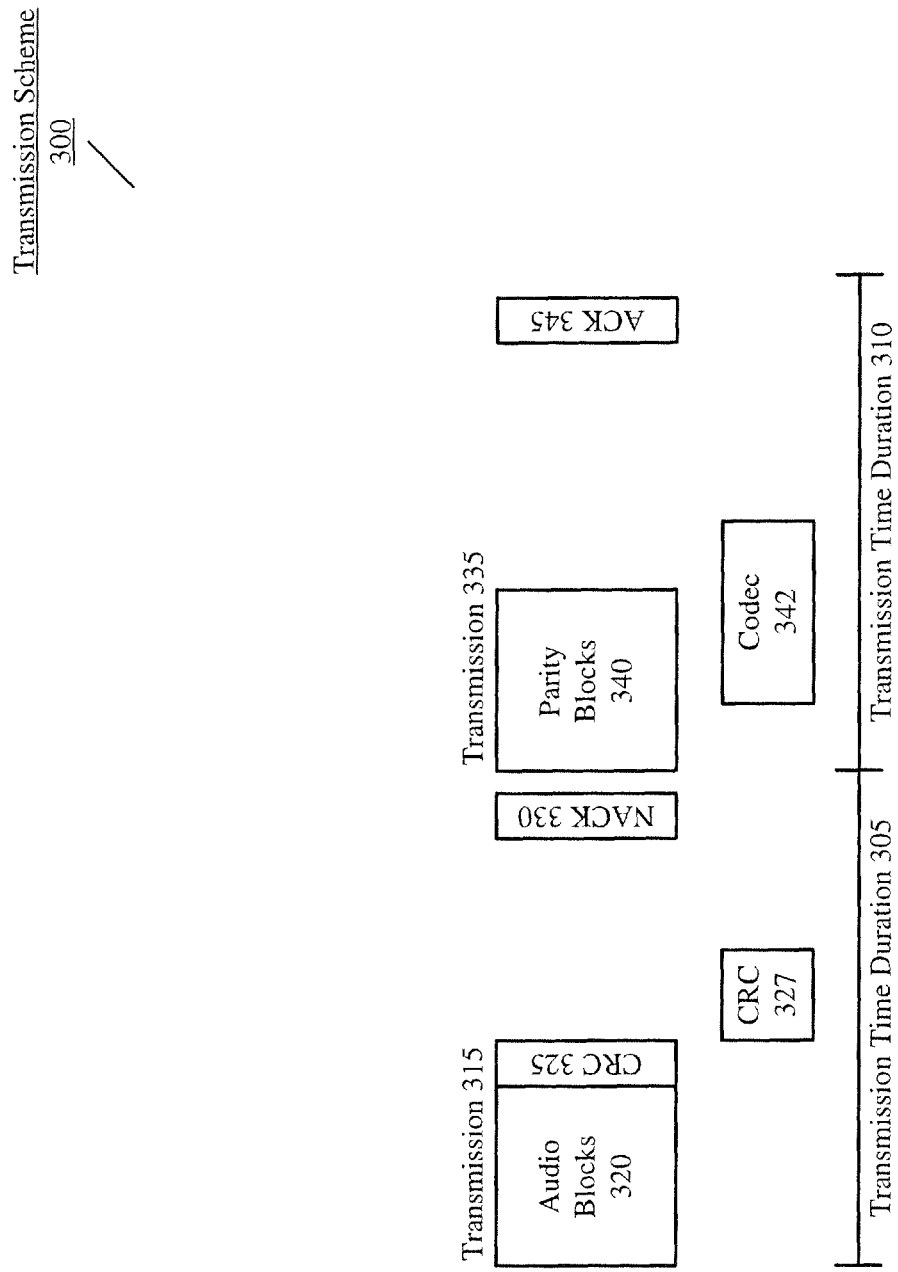

FIG. 3 shows a second exemplary transmission scheme 300 to transmit data from the source device 105 to the sink device 150 according to various exemplary embodiments described herein. The transmission scheme 300 illustrates a series of Bluetooth transmission time durations 305 and 310. The Bluetooth transmission time duration 305 may be used for a transmission 315 while the Bluetooth transmission time duration 310 may be used for a transmission 335. For illustrative purposes, the Bluetooth transmission time duration 305 may be for an initial transmission attempt and the Bluetooth transmission time duration 310 may be for a retransmission attempt. There may be a further Bluetooth transmission time duration (not shown) that follows the Bluetooth transmission time duration 310 if another retransmission attempt is available.

As described above, the transmission 315 for the initial transmission attempt may include a packet including audio blocks 320 and CRC information 325. As noted above, in an exemplary implementation, the audio blocks 315 may be segmented into 6 LDPC audio blocks with RS (60, 64) protection and occupying 300 bytes (e.g., sampled at 48 kHz and at 20 bit). The CRC information 325 may occupy up to 40 bytes. As the transmission 315 is being received during the Bluetooth transmission time duration 305, the receiving components of the transceiver 165 of the sink device 150 are active. With the receiving components active, the audio blocks 320 may be received and stored. When the audio blocks 320 and the CRC information 325 have been received, the check engine 175 may determine whether the payload data (e.g., audio blocks 320) of the received packet are correct using a CRC operation 327.

If the packet including the audio blocks 320 has passed the CRC operation, the sink device 150 may deactivate the receiving components and terminate receiving operations, e.g., the retransmission attempts may be omitted. Subsequently, at the predetermined time, the sink device 150 may transmit a response as an ACK (not shown) to indicate to the source device 105 that the packet was properly received in the Bluetooth transmission time duration 305.

If the packet including the audio blocks 320 has failed the CRC operation, at the predetermined time, the sink device 150 may transmit a response as a NACK 330 to indicate to the source device 105 that the packet was not properly received in the Bluetooth transmission time duration 305. For illustrative purposes, the transmission scheme 300 is described where the initial transmission attempt failed and the sink device 150 continues receiving operations so that the retransmission attempts may be used.

With the exchange of the NACK 330, a first retransmission attempt may be used. For example, in the Bluetooth transmission time duration 310, the transmission 335 includes the parity data as parity blocks 340. The sink device 150, via the correcting engine 180, may use the parity data and a codec operation 342 to attempt to restore the packet. Again, the codec operation 342 may be based on the LDPC encoding mechanism. Thus, the codec operation 342 may be performed after receiving a first one of the parity blocks 340. If restored, the sink device 150 may deactivate the receiving components and terminate receiving operations for the remainder of the Bluetooth transmission time duration 310. Subsequently, at the predetermined time, the sink device 150 may transmit the response as an ACK 345. If not restored, the sink device 150 may receive a second one of the parity blocks 340 and perform the codec operation 342. The sink device 150 may continue this process each time the packet is not restored until all the parity blocks 340 have been received and processed. If at any time the packet is restored using any one of the parity blocks 340, the sink device 150 may deactivate the receiving components and terminate the receiving operations. The sink device 150 may then transmit the response as the ACK 345. For illustrative purposes, the transmission scheme 300 shows that the packet was restored using the parity blocks 340. Thus, the second retransmission attempt may not be used.

If the packet is not restored after having received the transmission 335 including the parity blocks 340, the sink device 150 may continue the receiving operations for the purposes of a second retransmission attempt. In performing the second retransmission attempt, the above process for the first retransmission attempt as described with regard to the Bluetooth transmission time duration 310 may be repeated, the process for the initial transmission with regard to the Bluetooth transmission duration 305 may be repeated, or the first transmission mechanism as described above may be used. If the packet is not successfully received after the second retransmission attempt, the packet may be dropped.

As is evident from the transmission scheme 300, the unused portion of the transmission time duration 305 from using the Bluetooth HDR may allow for increased periods where the receiving components are deactivated. This is true for both the time after the initial transmission 315 and the time after the first retransmission 335. Thus, in retaining the capability of restoring a received packet, the sink device 150 may deactivate the receiving components and terminate the receiving operations, resulting in greater power conservation. In addition, since the audio blocks 320 are transmitted in a first Bluetooth transmission time duration using a first frequency and the parity blocks 340 are transmitted in a second Bluetooth transmission time duration using a second frequency, the audio blocks 320 and the parity blocks 340 may utilize frequency diversity.

Although the second transmission mechanism is described above with regard to using the Bluetooth HDR, the second transmission mechanism may also be implemented in the Bluetooth EDR2 or other conventional Bluetooth transmission protocols. For example, in any transmission attempt where the data payload of the received packet is determined to be incorrect, any ensuing retransmission attempt may transmit the parity data without the data payload of the packet. In this manner, the packet and the parity data may be transmitted with frequency diversity. However, in implementing the second transmission mechanism, when applied to the Bluetooth HDR, the power conservation may be further increased by deactivating the receiving components and terminating the receiving operations for the unused portion of the Bluetooth transmission time duration for each transmission attempt.

In using the above described transmission mechanisms according to the exemplary embodiments, the efficiency of packet transmission over the Bluetooth connection may be increased, particularly with regard to decreasing power usage by the sink device 150. Furthermore, using the LDPC further increases the efficiency. In a first example, there may be a SNR gain from increased redundancy. The Bluetooth HDR may utilize a code rate of 60/64 which has a ratio of 0.94. The LDPC may utilize a code rate of 300/600 which has a ratio of 0.5. Therefore, the capacity gain due to reducing the code rate is approximately 6 dB. The actual gap may be higher by at least 1 dB as the Bluetooth HDR uses hard decoding while the LDPC uses soft decoding (e.g., individually with each parity block). Although the exemplary embodiments may be implemented with other codes and corresponding codecs instead of LDPC such as RS (100, 50), WiFi convolutional code (BCC) with a rate having a ratio of 0.5, etc., the use of the LDPC provides other advantages. For example, in contrast to the RS (100, 50), the LDPC has a better coding gain (e.g., about 2 dB), a lower die size and power, has cores that are available from wireless standards such as IEEE 802.11n or 802.11ad, etc. In another example, while BCC may have a lower die size and power as well as having a core available from WiFi, in contrast to BCC, the LDPC has a better coding gain (e.g., about 1 dB).

Figure 4:
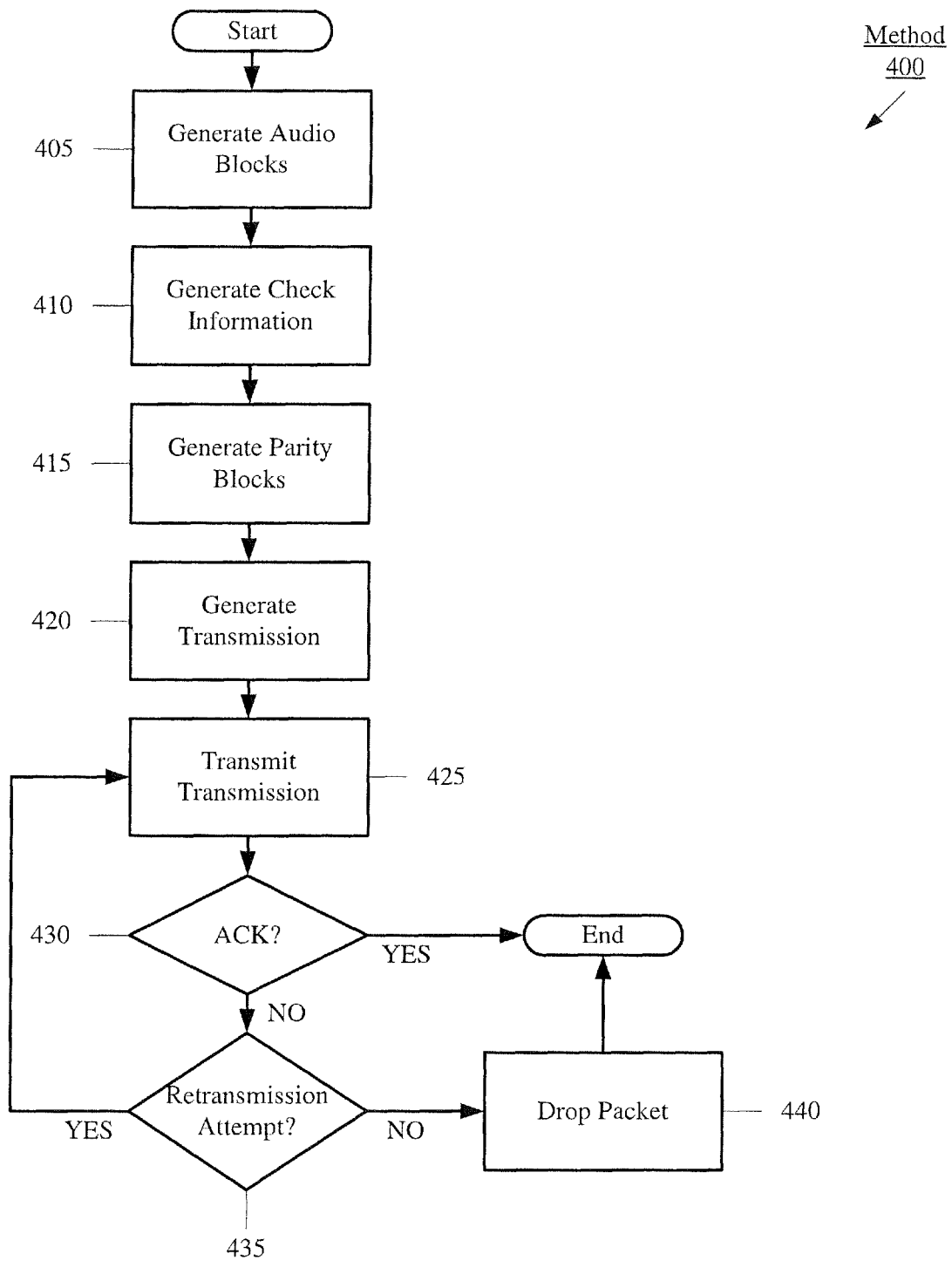
FIG. 4 shows flow diagram of exemplary operations associated with a transmission scheme performed by a source device, according to various exemplary embodiments described herein.

FIG. 4 shows an exemplary method 400 for performing the first transmission scheme by the source device 105 according to various exemplary embodiments described herein. The method 400 may relate to the source device 105 generating a transmission including parity data generated using LDPC destined for the sink device 150 using the Bluetooth HDR. The method 400 will be described with regard to the system 100 of FIG. 1 and the transmission scheme 200 of FIG. 2.

Initially, it may be assumed that the capability engine 125 has determined that the source device 105 and the sink device 150 are both capable of using the Bluetooth HDR. Accordingly, the first transmission mechanism according to the exemplary embodiments may be used.

In 405, the source device 105 generates audio blocks 215. As described above, in an exemplary embodiment, the first transmission mechanism may be used for audio to be output by the sink device 150 based on audio information provided by the source device 105. The audio blocks 215 may correspond to an audio packet bound for the sink device 150. Thus, an audio application that may be executed by the processor 110 may have audio data that is packaged in the audio packet including the audio blocks 215. In 410, the source device 105 generates check information such as the CRC information 217 for the audio blocks 215 of the audio packet.

In 415, the source device 105 generates parity blocks 225. As described above, the parity blocks 225 may correspond to parity data bound for the sink device 150. The parity blocks 225 may be an error correcting code that is encoded, for example, based on LDPC. The audio blocks 215 may therefore also be encoded at least partially using LDPC.

In 420, the source device 105 generates a transmission 210 including the audio blocks 215, the CRC information 217, and the parity blocks 225. According to one exemplary embodiment, the transmission 210 may also be generated in a predetermined order where the audio blocks 215 are transmitted first, the CRC information 217 is transmitted next, and the parity blocks 225 are transmitted last. Thus, in 425, the source device 105 transmits the transmission 210 to the sink device 150.

In 430, the source device 105 determines whether an ACK is received for the transmission 210. If an ACK is received, the source device 105 may proceed to the next audio packet and skip any retransmission attempts. If a NACK is received, the source device 105 continues to 435 to determine if there are any retransmission attempts available for the packet. If there is at least one retransmission attempt available, the source device 105 returns to 425 where the transmission 210 is retransmitted (e.g., on a different frequency). If there are no retransmission attempts available, the source device 105 continues to 440 where the packet is dropped.

The method 400 may be modified for a retransmission attempt. For example, the method 400 may return to 415 where the parity blocks 225 for a retransmission attempt may be changed. In this manner, a new transmission may be generated that includes the audio blocks 215 and the CRC information 217 along with different parity blocks from the parity blocks 225.

Figure 5:
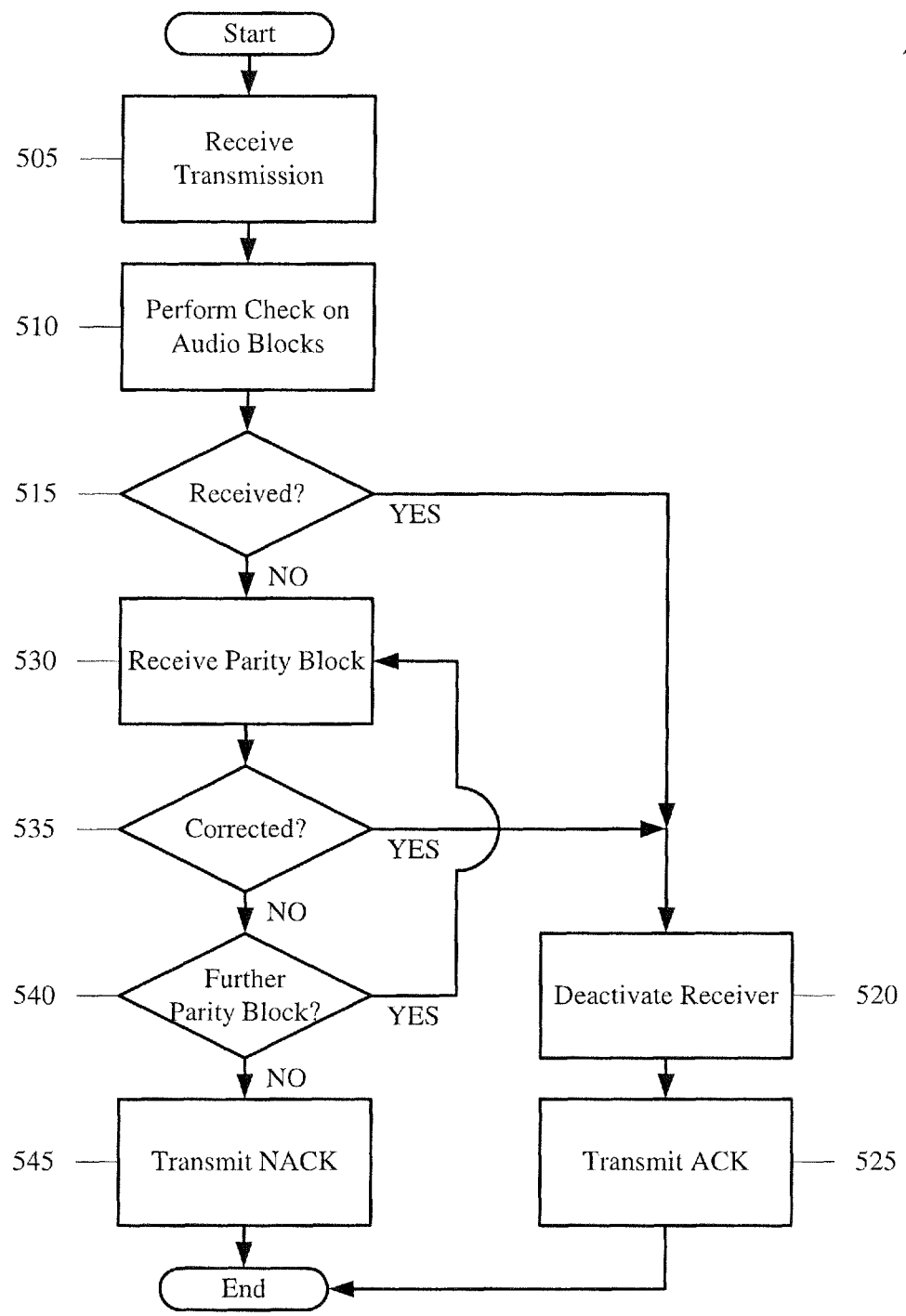
FIG. 5 a flow diagram of exemplary operations associated with the transmission scheme performed by a sink device, according to various exemplary embodiments described herein.

FIG. 5 shows an exemplary method 500 of performing the first transmission scheme by the sink device 150 according to various exemplary embodiments described herein. The method 500 may relate to the sink device 150 receiving a transmission including the parity data from the source device 105 using the Bluetooth HDR, e.g., the method 500 is the corresponding operations for the transmission method 400. The method 500 will be described with regard to the system 100 of FIG. 1 and the transmission scheme 200 of FIG. 2.

Initially, it may be assumed that the capability engine 125 has determined that the source device 105 and the sink device 150 are both capable of using the Bluetooth HDR. Accordingly, the first transmission mechanism according to the exemplary embodiments may be used.

In 505, the sink device 150 receives the transmission 210. As described above, the sink device 150 may receive the transmission 210 during the transmission time duration 205. In receiving the transmission 210, the sink device 150 may first receive the audio blocks 215, followed by the CRC information 217, and finally the parity blocks 225, each received datum being stored in the memory arrangement 160 for further processing. Thus, after receiving the audio blocks 215 and the CRC information 217, in 510, the sink device 150 may perform a CRC operation 220 on the audio packet using the CRC information 217 and the audio blocks 215.

In 515, the sink device 150 determines whether the CRC operation 220 indicates the audio blocks 215 are correct. If correct, the sink device 150 continues to 520 where receiving components of the transceiver 165 are deactivated and receiving operations are terminated. In 525, the sink device 150 transmits an ACK to indicate that the audio packet was properly received, shown as response 235 in FIG. 2.

Returning to 515, if incorrect, the sink device 150 continues to 530 where the receiver operations are continued to receive the parity blocks 225. For example, a first one of the parity blocks 225-1' may be received. As described above, the parity blocks 225 may be encoded with LDPC, which is a systematic codec.

In 535, the sink device 150 determines whether the received packet has been restored using the first parity block 225-1'. For example, as described above, the codec operation 230 may be used on the first audio block 215-1 using the first parity block 225-1' and a subsequent reperformance of the CRC operation 220 may be used to correct the audio blocks 215. If corrected, the sink device 150 continues to 520 and the receiving components may be deactivated along with the receiving operations being terminated for the remainder of the transmission time duration 205. If not corrected, the sink device 150 continues to 540 to determine whether there are any further parity blocks 225 being received in the transmission 210. If there is at least one more parity block 225, the sink device 150 returns to 530. However, if there is no further parity block and the packet remains unrestored, the sink device 150 continues to 545 so that a NACK may be returned to the source device 105.

The method 500 may be further extended to cover retransmission attempts in which further transmissions corresponding to the packet are retransmitted from the source device 105 to the sink device 150. The retransmission attempts may be substantially similar to the transmission 210. In a first example, the same audio blocks 215, the same CRC information 217, and the same parity blocks 225 may be used. In a second example, the same audio blocks 215, the same CRC information 217, but different parity blocks 225 may be used. In addition, the retransmission attempts may be transmitted on a different frequency.

Figure 6:
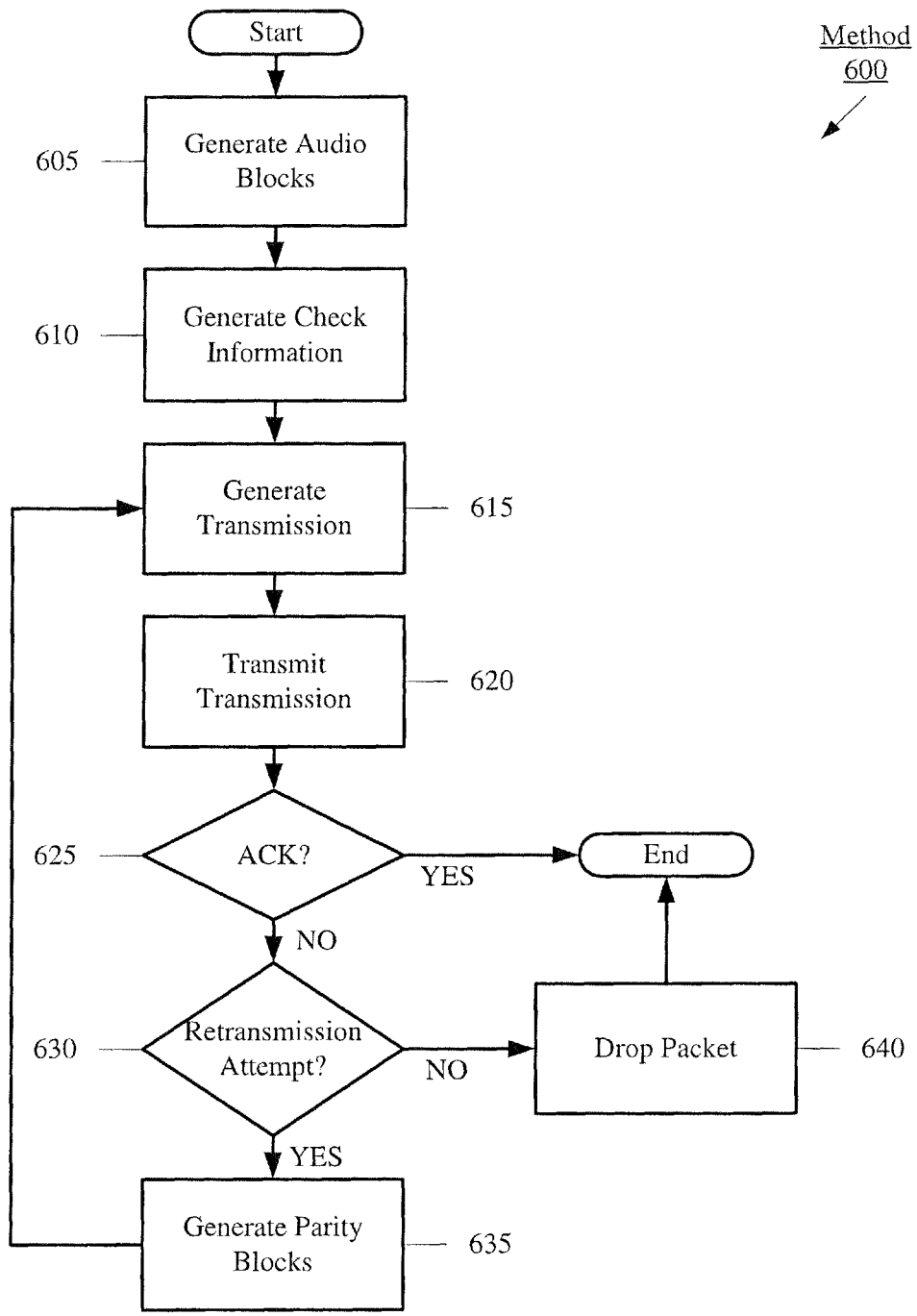
FIG. 6 shows a flow diagram of exemplary operations associated with another transmission scheme performed by a source device, according to various exemplary embodiments described herein.

FIG. 6 shows an exemplary method 600 for performing the second transmission scheme by the source device 105 according to various exemplary embodiments described herein. The method 600 may relate to the source device 105 generating a transmission for the sink device 150 using the Bluetooth HDR. The method 600 will be described with regard to the system 100 of FIG. 1 and the transmission scheme 300 of FIG. 3.

Initially, it may be assumed that the capability engine 125 has determined that the source device 105 and the sink device 150 are both capable of using the Bluetooth HDR. However, the second transmission mechanism may also be used with the conventional Bluetooth EDR2.

In 605, the source device 105 generates audio blocks 320. As described above, in an exemplary embodiment, the second transmission mechanism may be used for audio to be output by the sink device 150 based on audio information provided by the source device 105. The audio blocks 320 may correspond to an audio packet bound for the sink device 150. Thus, an audio application executed by the processor 110 may have audio data that is packaged in the audio packet including the audio blocks 320. In 610, the source device 105 generates check information such as the CRC information 325 for the audio blocks 320 of the audio packet.

In 615, the source device 105 generates a transmission 315 including the audio blocks 320 and the CRC information 325. According to one exemplary embodiment, the transmission 315 may be generated in a predetermined order where the audio blocks 320 are transmitted first followed by the CRC information 325. In 620, the source device 105 transmits the transmission 315 to the sink device 150.

In 625, the source device 105 determines whether an ACK is received for the transmission 315. If an ACK is received, the source device 105 may proceed to the next audio packet and skip any retransmission attempts. If a NACK is received, the source device 105 continues to 630. In 630, the source device 105 determines if there are any retransmission attempts available for the packet. If there are no retransmission attempts available, the source device 105 continues to 640 where the packet is dropped.

If there is at least one retransmission attempt available, the source device 105 continues to 635. In 635, the source device 105 generates parity blocks 340. As described above, the parity blocks 340 may correspond to parity data for the audio blocks 320. The parity blocks 340 may be an error correcting code, for example, based on LDPC. The audio blocks 320 may therefore also be encoded at least partially on LDPC. After generating the parity blocks 340, the source device 105 returns to 615. In returning to 615, the source device 105 generates a transmission 335 including only the parity blocks 340. Thus, in 620, the source device 105 transmits the transmission 335 including the parity blocks 340. The source device 105 may then perform 625-640 based on the result of the transmission 335 and any remaining retransmission attempts. Typically, the retransmission attempts including the parity blocks 340 are transmitted using a different frequency than the transmission 315 including the audio blocks 320.

The method 600 may be modified. For example, the method 600 as illustrated relates to an exemplary embodiment in which any further retransmission attempt generates a transmission substantially similar to the transmission 335 including only parity blocks 340. However, additional retransmission attempts beyond the first retransmission attempt may use the same scheme as the first retransmission attempt or a different scheme. In a first example, the transmission for the second retransmission attempt and beyond may be substantially similar to the transmission 315 by including the audio blocks 320. In a second example, the transmission for the second retransmission attempt and beyond may be substantially similar to the transmission 210 in which audio blocks 215 and parity blocks 225 are included. The source device 105 may be configured to utilize a predetermined one of these options or may also be configured to dynamically select among these options. For example, based on current conditions of the Bluetooth connection (e.g., based on connection metrics), the source device 105 may select the transmission 315 when the conditions indicate a quality greater than a first threshold, select the transmission 335 when the conditions indicate a quality less than the first threshold but greater than a second threshold, or select the transmission 210 when the conditions indicate a quality less than the second threshold.

Figure 7:
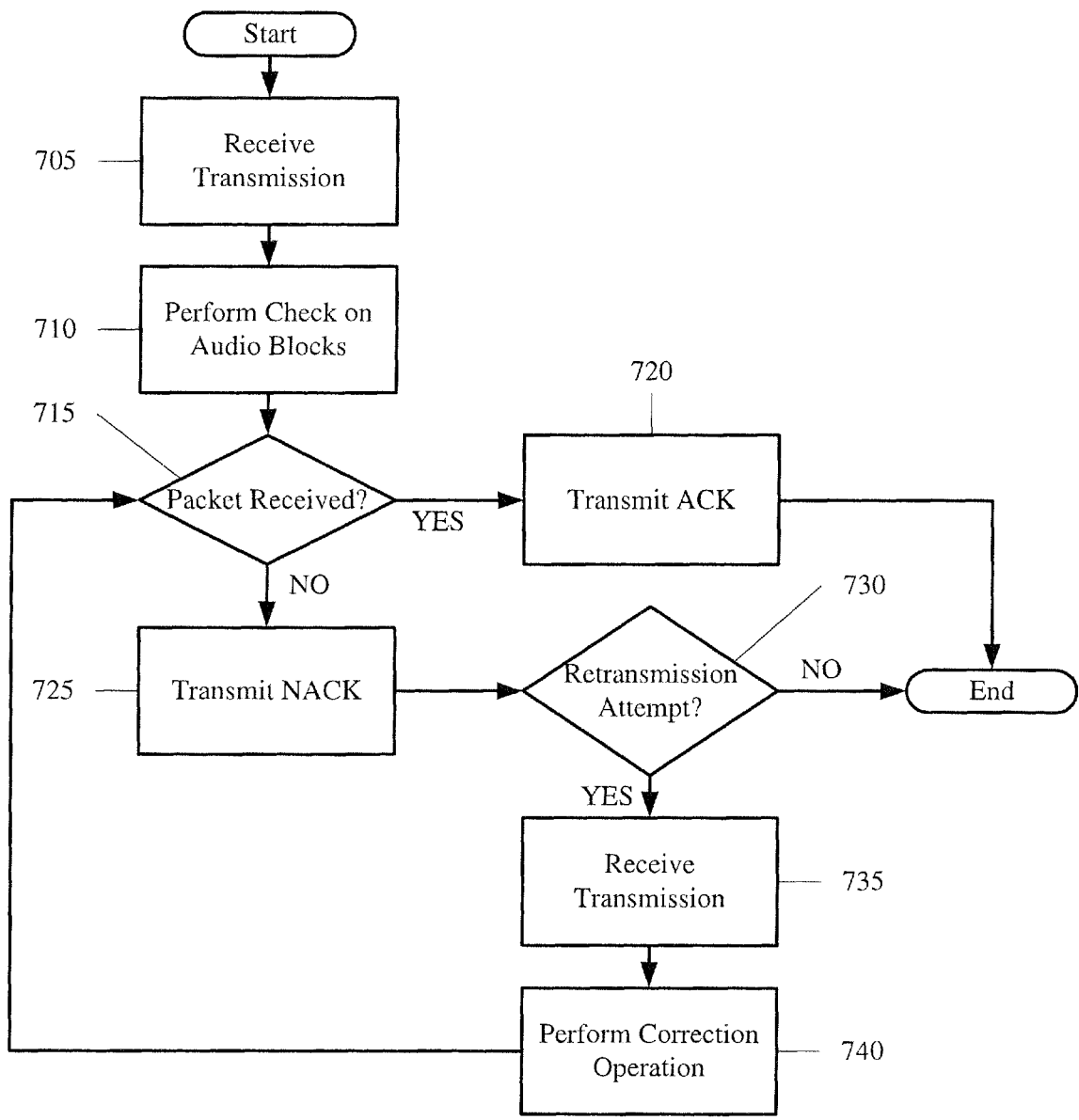
FIG. 7 shows a flow diagram of exemplary operations associated with the other transmission scheme performed by a sink device, according to various exemplary embodiments described herein.

FIG. 7 shows an exemplary method 700 for performing the second transmission scheme by the sink device 150 according to various exemplary embodiments described herein. The method 700 may relate to the sink device 150 receiving a transmission from the source device 105 using the Bluetooth HDR, e.g., the method 700 is the corresponding operations for the transmission method 600. The method 700 will be described with regard to the system 100 of FIG. 1 and the transmission scheme 300 of FIG. 3.

Initially, it may be assumed that the capability engine 125 has determined that the source device 105 and the sink device 150 are both capable of using the Bluetooth HDR. However, the second transmission mechanism may also be used with the conventional Bluetooth EDR2.

In 705, the sink device 150 receives the transmission 315. As described above, the sink device 150 may receive the transmission 315 as an initial transmission attempt of an audio packet. In receiving the transmission 315, the sink device 150 may first receive the audio blocks 320, followed by the CRC information 325, each received datum being stored in the memory arrangement 160 for further processing. After receiving the audio blocks 215 and the CRC information 325, in 710, the sink device 150 may perform a check on the audio packet using the CRC information 325 and processing the audio blocks 320 using a CRC operation 327.

In 715, the sink device 150 determines whether the CRC operation 327 indicates the audio blocks 320 of the received audio packet are correct. If correct, the sink device 150 continues to 720 where receiving components of the transceiver 165 are deactivated and receiving operations are terminated. In 720, the sink device 150 also transmits an ACK to indicate that the audio packet was properly received.

Returning to 715, if incorrect, the sink device 150 continues to 725. In 725, the sink device 150 maintains the receiver operations and also transmits a NACK to indicate that the audio packet was not properly received.

In 730, the sink device 150 determines whether there are any retransmission attempts remaining. If no retransmission attempts remain, the packet is dropped by the source device 105 and the sink device 150 also moves onto any further audio packets. If there is at least one retransmission attempt available, the sink device 150 continues to 735. In 735, the sink device 150 receives the transmission 335 which includes the parity blocks 340. For example, a first one of the parity blocks 340 may be received. Again, the parity blocks 340 may be encoded with LDPC which is a systematic codec. Although not shown, the method 700 may also use this feature of the systematic codec so that the parity blocks 340 are processed individually to restore the received audio packet.

With each parity block 340 being received, the sink device 150 determines whether the received packet has been restored using the codec operation 342. If corrected, the sink device 150 continues to 720 and the receiving components may be deactivated along with the receiving operations being terminated for the remainder of the transmission 335. If not corrected, the sink device 150 continues to process further parity blocks 340. If there are no further parity blocks and the packet remains unrestored, the sink device 150 continues to 725 so that a NACK may be returned to the source device 105. The sink device 105 then continues to 730 for additional retransmission attempts, if available.

The method 700 may be modified to correspond to any modification of the method 600. For example, the method 700 may also be modified for the various transmissions generated for a second retransmission attempt and beyond. Accordingly, in a first example, if the transmission for the second retransmission attempt is substantially similar to the transmission 315, the sink device 105 may use 710 and perform the CRC operation 327 on the received packet. In a second example, if transmission for the second retransmission attempt is substantially similar to the transmission 335, the sink device 105 may use 740 and attempt to correct the packet using the parity blocks in the second retransmission. In a third example, if the transmission for the second retransmission attempt is substantially similar to the transmission 210, the sink device 105 may use the method 600 as shown.

In a further exemplary embodiment, the second transmission scheme illustrated in FIG. 3 and described with reference to the methods 600 and 700 may be modified to include separate CRC information for each audio block. For example, instead of having a single CRC information block 325 transmitted at the end of the audio blocks 320, a smaller CRC information block may be transmitted after each individual audio block of the audio blocks 320. To provide an example, the single CRC information block 325 may have a size of 40-bytes. If six individual CRC information blocks are sent after each individual audio block, each individual CRC block may be 6.5 bytes. The individual CRC blocks may then be used to check each individual audio block and identify the specific audio block, if any, that has an error. Thus, when the source device 105 transmits the parity blocks 340, the transmission may be limited to those parity blocks that correspond to the individual audio blocks that included errors, e.g., not all of the parity blocks need to be sent. The sink device 150 may identify the individual audio blocks that included errors (or the audio blocks that did not include errors) in the NACK 330, so that the source device 105 understands the individual parity blocks that should be sent to correct the individual audio blocks.

Those skilled in the art will understand that the above described mechanisms may enable a dynamic and efficient determination to deactivate a receiver of the sink device 150 while receiving data from the source device 105. For example, the sink device 150 may selectively deactivate the receiver at any time that the packet is determined to be properly received. In using the first or second transmission mechanism described above, when an initial transmission attempt for the packet fails, the sink device 150 may receive the parity data where each parity block may allow the packet to be determined to be properly received. Any unused portion of a transmission time duration may be used to deactivate the receiver to conserve power.

The exemplary embodiments provide a device, system, and method of transmitting a transmission using a Bluetooth connection from a source device to a sink device in which parity data may be used. Based on Bluetooth HDR in which an unused portion may be used to transmit redundancy data or deactivate receiving components and terminate receiving operations, the exemplary embodiments provide first and second transmission mechanisms that utilize the features of the Bluetooth HDR. In the first transmission mechanism, the unused portion in a Bluetooth transmission time duration may be used to include redundancy data corresponding to a packet. Thus, a transmission may include the packet, any check information, and the redundancy data. By efficiently transmitting the packet in this manner according to the first transmission mechanism, an overall power conservation by the sink device may be increased. In a second transmission mechanism, the packet may be transmitted in a first transmission with redundancy data being transmitted as needed in a second transmission if the first transmission failed to be successfully received. By efficiently and dynamically transmitting the packet in this manner according to the second transmission mechanism, an overall power conservation by the sink device may be increased as well as utilize the benefits of frequency diversity between the packet and the redundancy data.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a sink device configured to establish a Bluetooth connection with a source device and receive a transmission comprising a plurality of data blocks, an item of check information, and a plurality of parity blocks during a transmission time duration:
   determining, prior to receiving an entirety of the transmission, whether an error is included in at least one of the received data blocks based on at least the item of check information; and
   when at least one of the received data blocks includes the error and prior to receiving all of the plurality of parity blocks, performing an error correction operation on at least one of the received data blocks based on a first parity block of the plurality of parity blocks, wherein, when the error correction operation corrects the error in the at least one of the received data blocks, discontinuing reception of the transmission prior to receiving all of the plurality of parity blocks.

2. The method of claim 1, further comprising:
   when the received data blocks do not include the error, discontinuing reception of the transmission prior to receiving all of the plurality of parity blocks by deactivating a receiver of the sink device for a remainder of the transmission time duration.

3. The method of claim 1, further comprising:
   when the error correction operation does not correct the error in the at least one of the received data blocks and prior to receiving all of the plurality of parity blocks, performing a second error correction operation on at least a second received data block based on a second parity block of the plurality of parity blocks.

4. The method of claim 1, wherein the plurality of parity blocks are encoded based on a low density parity check (LDPC) coding scheme.

5. The method of claim 1, wherein the first parity block corresponds to a first data block of the received data blocks and the error correction operation on the at least one of the received data blocks is performed on the first data block.

6. The method of claim 1, further comprising:
   determining, based on at least the item of check information and after the error correction operation has been performed, whether the error remains in the at least one of the received data blocks.

7. The method of claim 1, wherein the plurality of data blocks comprise audio blocks.

8. A sink device, comprising:
   a transceiver configured to establish a Bluetooth connection with a source device and receive a transmission comprising a plurality of data blocks, an item of check information, and a plurality of parity blocks during a transmission time duration; and
   a processor configured to determine, prior to receiving an entirety of the transmission, whether at least one of the received data blocks includes an error based on at least the item of check information, the processor further configured to, when the at least one of the received data blocks include the error and prior to receiving all of the plurality of parity blocks, perform an error correction operation on at least one of the received data blocks based on a first parity block of the plurality of parity blocks wherein, when the error correction operation corrects the error in the at least one of the received data blocks, the transceiver discontinues reception of the transmission prior to receiving a last parity block of the plurality of parity blocks.

9. The sink device of claim 8, wherein the transceiver, when the received data blocks do not include the error, discontinues reception of the transmission prior to receiving a last parity block of the plurality of parity blocks by deactivating a receiver portion of the transceiver.

10. The sink device of claim 9, wherein the transceiver transmits an ACK.

11. The sink device of claim 8, wherein the processor, when the error correction operation does not correct the error and prior to receiving all of the plurality of parity blocks, performs a second error correction operation on at least a second received data block based on a second parity block of the plurality of parity blocks.

12. The sink device of claim 8, wherein the sink device comprises an audio output device and the plurality of data blocks comprise audio blocks.

13. The sink device of claim 12, wherein the audio output device comprises at least one wireless audio ear bud, a wireless earpiece, a wireless headset, a wireless speaker, a hands-free headset, or an intercom.

14. A method, comprising:
    at a sink device configured to establish a Bluetooth connection with a source device and receive transmissions in respective transmission time durations:
    receiving a first transmission from the source device in a first transmission time duration, the first transmission comprising a plurality of data blocks and an item of check information;
    determining whether at least one of the received data blocks includes an error based on at least the item of check information;
    when the error is included in the at least one of the received data blocks, receiving a second transmission from the source device in a second transmission time duration, the second transmission comprising one or more parity blocks; and
    performing an error correction operation on the at least one of the received data blocks based on a first parity block of the one or more parity blocks wherein, when the error correction operation successfully corrects the error in the at least one received data blocks prior to receiving all of the parity blocks, discontinuing reception of a remainder of the second transmission.

15. The method of claim 14, further comprising:
    when the error correction operation does not correct the error, performing a second error correction operation on a second received data block based on a second parity block of the one or more parity blocks.

16. The method of claim 14, wherein the item of check information comprises a plurality of items of check information, wherein each of the items of check information is transmitted after a corresponding one of the plurality of data blocks.

17. The method of claim 16, wherein determining whether the at least one received data blocks includes the error based on at least the item of check information comprises checking each of the received data blocks based on the corresponding one of the items of check information, wherein the method further comprises:
    transmitting information to the source device that identifies one or more of the received data blocks that include the error based on the corresponding items of check information, wherein the second transmission comprises only parity blocks corresponding to the identified one or more of the received data blocks.

18. The method of claim 14, further comprising:
    when the error correction operation does not correct the error in the at least one of the received data blocks, determining whether a retransmission attempt is available for the first transmission; and
    when a retransmission attempt is available, receiving a third transmission in a third transmission time duration.

19. The method of claim 18, wherein the third transmission comprises one of (a) the plurality of data blocks and the item of check information, (b) the one or more parity blocks identical to the second transmission, (c) one or more parity blocks that are different from the one or more parity blocks of the second transmission or (d) the plurality of data blocks, the item of check information and the one or more parity blocks.

20. The method of claim 14, wherein the sink device comprises at least one of: a wireless audio ear bud, a wireless earpiece, a wireless headset, a wireless speaker, a hands-free headset, or an intercom.

* * * * *